(12) United States Patent
Andre et al.

(10) Patent No.: US 9,643,666 B2
(45) Date of Patent: May 9, 2017

(54) REMOVABLE SUPPORTING CROSS-MEMBER PROVIDED WITH AN ADJUSTABLE-HEIGHT FIFTH WHEEL FOR SUPPORTING A SEMI-TRAILER DURING THE LOADING, RAIL TRANSPORT AND UNLOADING THEREOF

(75) Inventors: Jean-Luc Andre, Molsheim (FR); Jacques Ober, Strasbourg (FR)

(73) Assignee: LOHR INDUSTRIE, Hangenbieten (FR)

( * ) Notice: Subject to any disclaimer, the term of this patent is extended or adjusted under 35 U.S.C. 154(b) by 516 days.

(21) Appl. No.: 13/583,328

(22) PCT Filed: Mar. 8, 2011

(86) PCT No.: PCT/IB2011/050965
§ 371 (c)(1),
(2), (4) Date: Oct. 18, 2012

(87) PCT Pub. No.: WO2011/110996
PCT Pub. Date: Sep. 15, 2011

(65) Prior Publication Data
US 2013/0078078 A1    Mar. 28, 2013

(30) Foreign Application Priority Data
Mar. 8, 2010  (FR) ..................................... 10 00923

(51) Int. Cl.
*B62D 53/08*   (2006.01)
*B61D 3/18*    (2006.01)
(Continued)

(52) U.S. Cl.
CPC ......... *B62D 53/0807* (2013.01); *B61D 3/184* (2013.01); *B61D 45/005* (2013.01); *B62D 53/0864* (2013.01); *B65G 67/04* (2013.01)

(58) Field of Classification Search
CPC .................................................. B62D 53/0807
(Continued)

(56) References Cited

U.S. PATENT DOCUMENTS 3,161,150 A * 12/1964 Sable .............................. 410/87
3,183,854 A    5/1965 Candlin, Jr. et al.
(Continued)

FOREIGN PATENT DOCUMENTS

EP    0 720 939 A2   7/1996
FR    2 815 005 A1   4/2002
(Continued)

OTHER PUBLICATIONS

French Search Corresponding to FR10 00923.
International Search Corresponding to PCT/IB2011/050965.

*Primary Examiner* — Jonathan Snelting
(74) *Attorney, Agent, or Firm* — Davis & Bujold PLLC; Michael J. Bujold

(57) ABSTRACT

The invention relates to a removable supporting cross-member (1) comprising: a built-in adjustable-height fifth wheel (18) for receiving the kingpin of semi-trailer, and front (26, 27) and rear (28) openings for the passage of the fork arms of a forklift truck or tractor. The invention can be used for moving a semi-trailer, positioning the semi-trailer horizontally on a carriage and securing same for transport, as well as for the corresponding operations during unloading, using only a forklift truck or tractor suitably dimensioned for the loads to be supplied. The invention is suitable for use by those involved in intermodal trail transport.

19 Claims, 7 Drawing Sheets

(51) Int. Cl.
*B61D 45/00* (2006.01)
*B65G 67/04* (2006.01)

(58) Field of Classification Search
USPC .............. 414/592, 607, 333, 809; 410/58–64
See application file for complete search history.

(56) References Cited

U.S. PATENT DOCUMENTS

| | | | | | |
|---|---|---|---|---|---|
| 3,254,900 | A | * | 6/1966 | Allen ............................. | 280/29 |
| 3,497,169 | A | * | 2/1970 | Enochian ............ | B61D 45/005 |
| | | | | | 410/60 |
| 4,129,079 | A | * | 12/1978 | Shannon ........................ | 410/1 |
| 4,626,154 | A | * | 12/1986 | Hesch .................. | B61D 45/005 |
| | | | | | 267/70 |
| 5,112,172 | A | * | 5/1992 | Engle ............................. | 410/59 |
| 5,551,815 | A | * | 9/1996 | Rainbow ............ | B62D 53/0864 |
| | | | | | 410/56 |
| 6,338,605 | B1 | * | 1/2002 | Halverson et al. .......... | 414/333 |
| 6,666,148 | B1 | * | 12/2003 | Coslovi et al. ............... | 105/404 |
| 6,968,788 | B1 | * | 11/2005 | Coslovi ........................ | 105/355 |
| 7,232,282 | B2 | * | 6/2007 | Engle ........................... | 410/59 |
| 8,286,997 | B2 | * | 10/2012 | Kimener et al. ........... | 280/763.1 |
| 8,365,674 | B2 | * | 2/2013 | Banwart ........................ | 105/3 |
| 8,528,929 | B2 | * | 9/2013 | Kimener .................... | 280/476.1 |
| 2011/0107938 | A1 | * | 5/2011 | Weidemann et al. .......... | 104/29 |

FOREIGN PATENT DOCUMENTS

| | | | | |
|---|---|---|---|---|
| FR | 2 884 479 | A1 | 10/2006 | |
| FR | 2884479 | A1 * | 10/2006 | ............. B61D 3/18 |
| WO | 92/04219 | A1 | 3/1992 | |

* cited by examiner

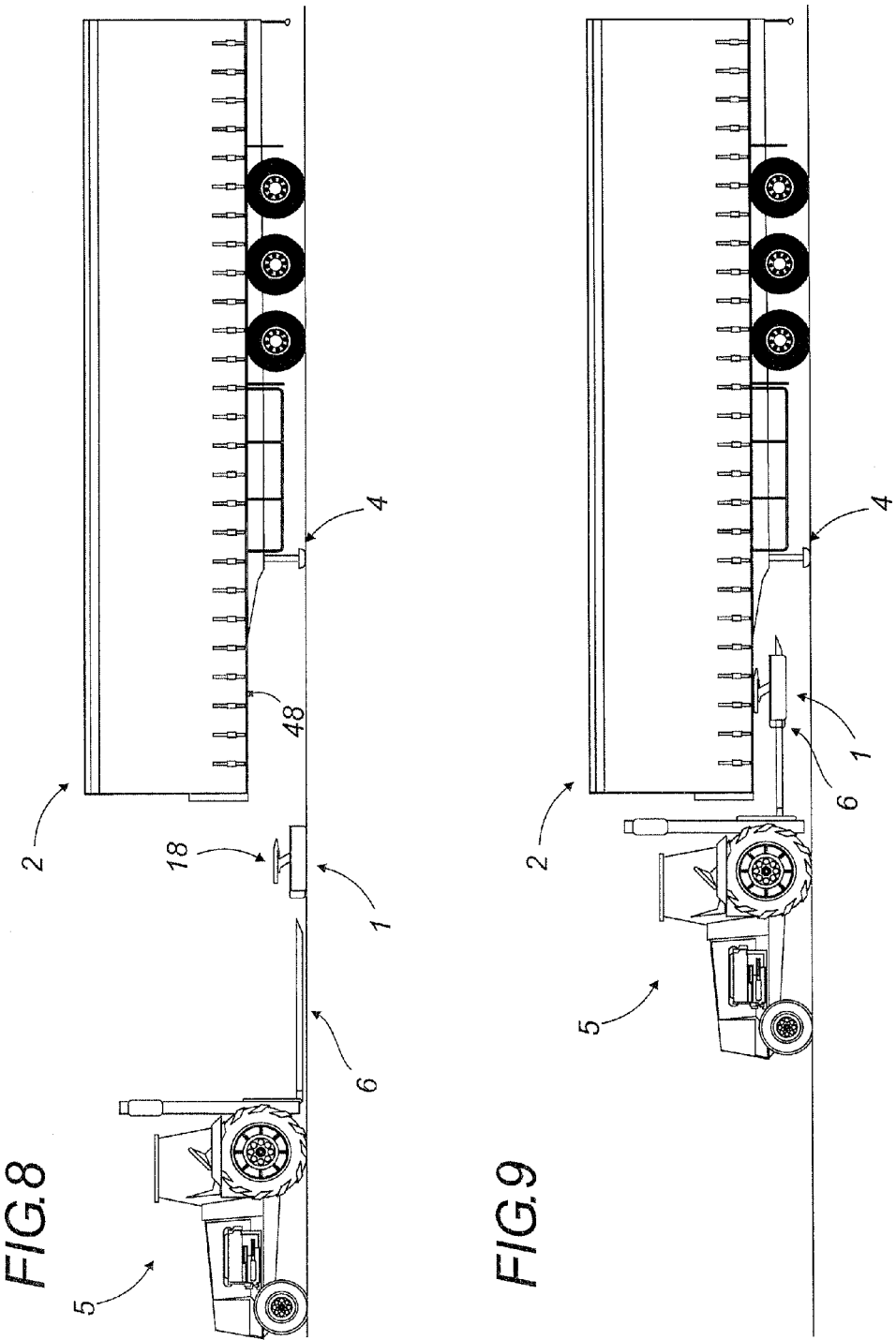

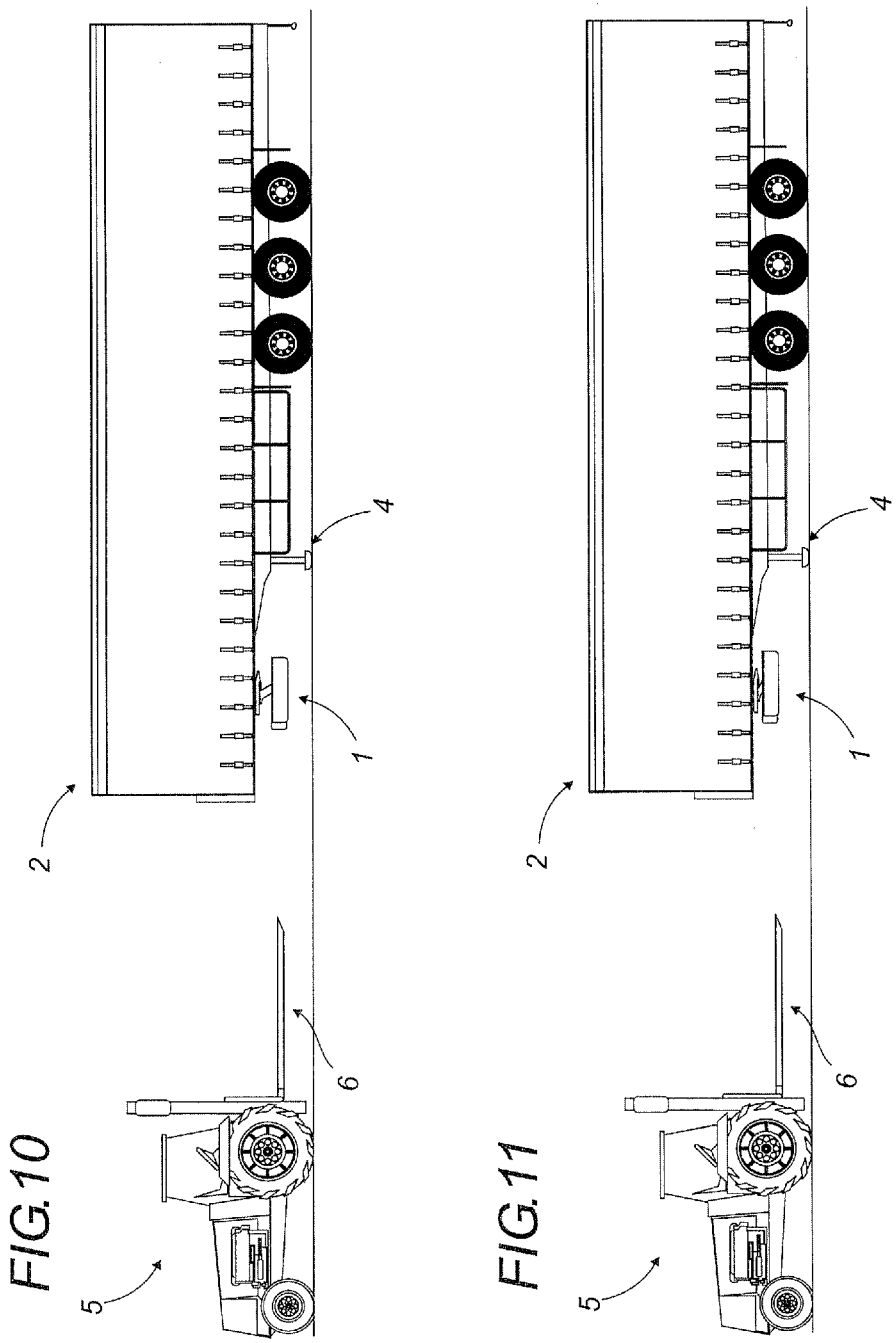

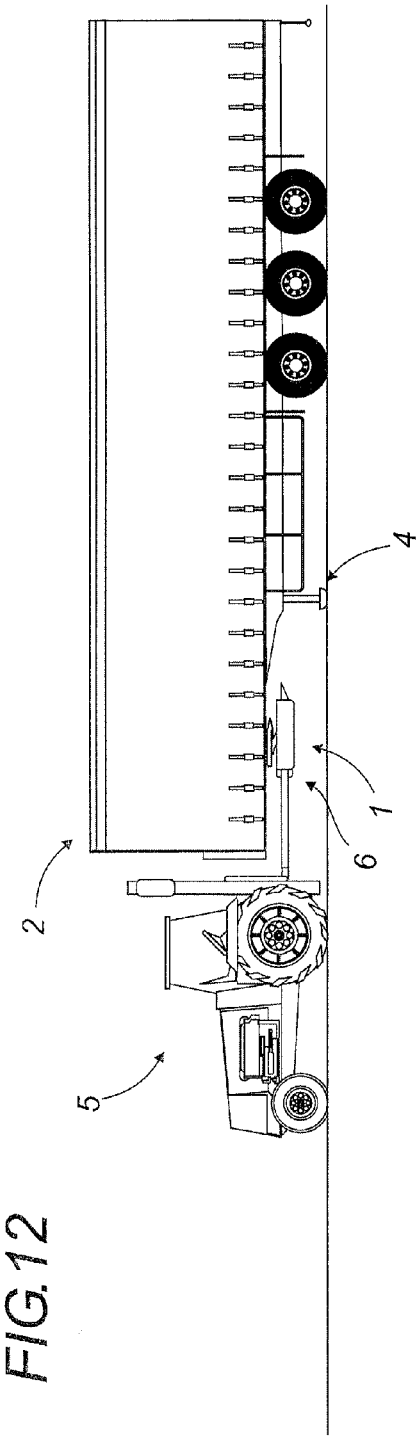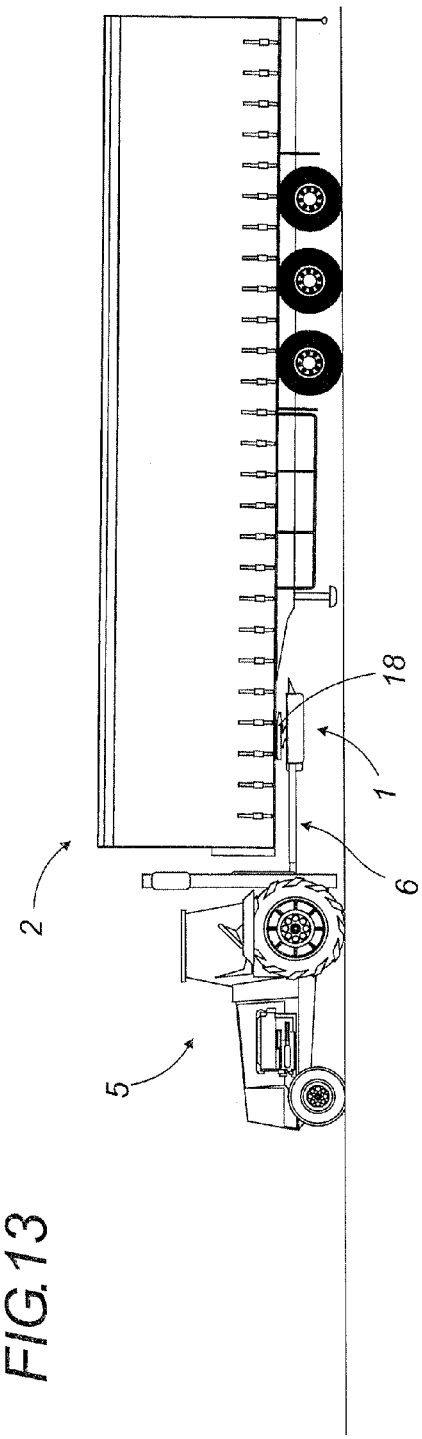

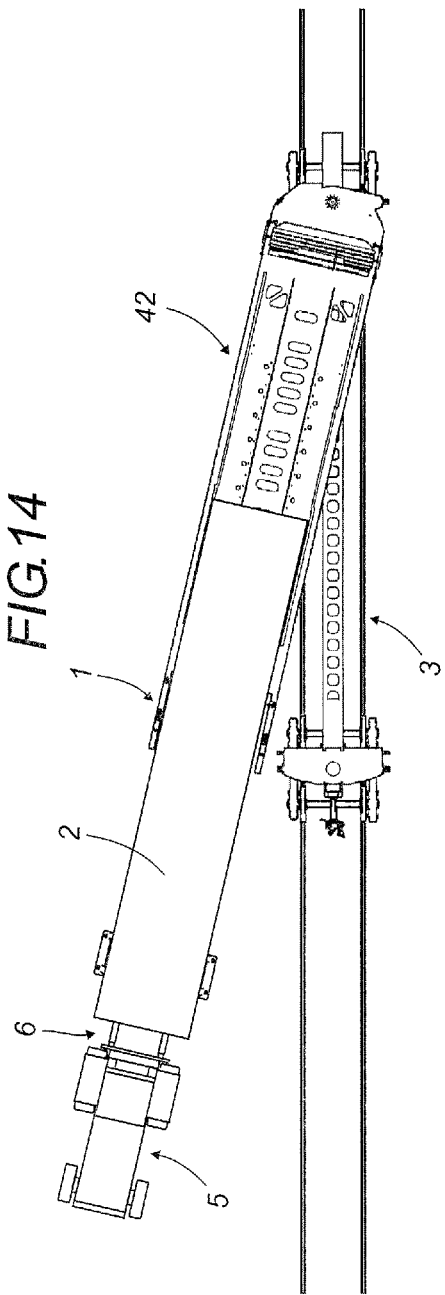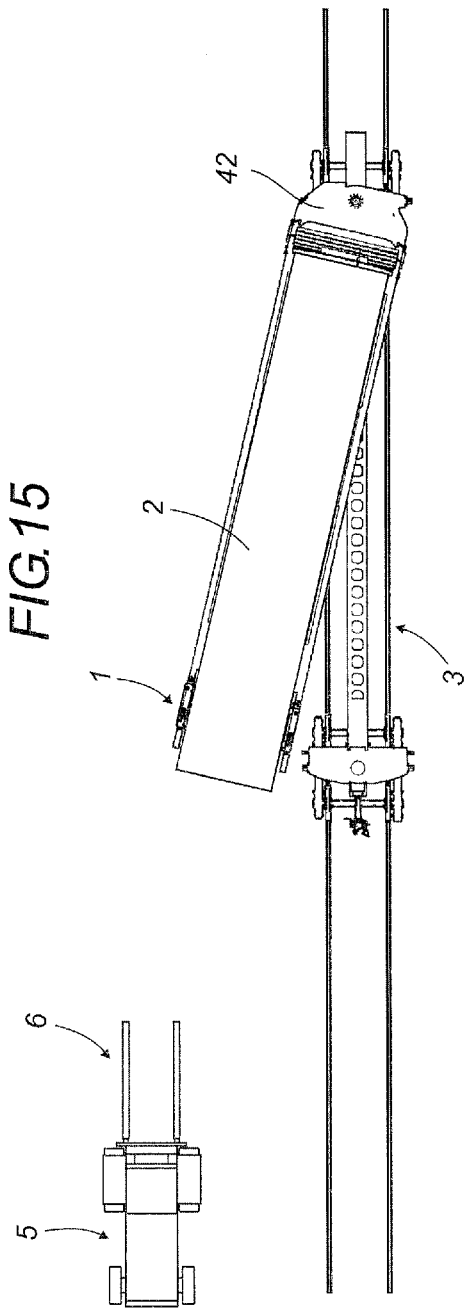

REMOVABLE SUPPORTING CROSS-MEMBER PROVIDED WITH AN ADJUSTABLE-HEIGHT FIFTH WHEEL FOR SUPPORTING A SEMI-TRAILER DURING THE LOADING, RAIL TRANSPORT AND UNLOADING THEREOF

This application is a National Stage completion of PCT/IB2011/050965 filed Mar. 8, 2011, which claims priority from French patent application serial no. 10/00923 filed Mar. 8, 2010.

FIELD OF THE INVENTION

The invention relates to a supporting cross-member that can be removed and manipulated for the loading, unloading and rail transportation of a semi-trailer using an intermodal transport railway car, and to the method of loading this semi-trailer onto the car.

BACKGROUND OF THE INVENTION

Semi-trailers are now transported by rail more and more frequently.

They are loaded onto special cars and secured to ensure they are kept in place for the entire journey.

The semi-trailers are loaded and unloaded in mixed roadway and rail terminals according to different techniques.

One currently preferred technique consists of using cars with a supporting railway structure that can be disconnected from the movable base, specifically by pivoting either centrally or at one extremity.

If the structure pivots centrally, access or egress is possible at either one of its extremities, whereas if it pivots at one extremity, this leaves only one extremity free for the semi-trailer to enter and leave before and after transport.

There are also other possible ways to open it, such as for example, the lateral translation of the supporting railway structure or vertical manipulation using a lifting device.

French Patent No. FR 2884479 owed by ARBEL FAUVET RAIL corporation describes a housing designed to receive a semi-trailer and the railway car equipped with such a housing.

According to this invention, a removable technical assembly for attaching the semi-trailer using its kingpin is attached by moving it translationally to the end of a receptor housing on a semi-trailer. This housing is equipped with two tracks and its arms rest on the rail car girders, constituting the removable base supporting the semi-trailer. A removable technical assembly comprises a socket to which a pillar or a column is attached supporting at its intermediate portion a cross-member and at its upper portion a fifth connecting wheel for the kingpin of the semi-trailer. This cross-member has receptor cases for the gripping elements of a handling apparatus. Locking and unlocking means are also provided.

The removable technical assembly of this invention can only be used with the receptor means on its socket by engaging a repositionable housing supported by a rail car, constituting the base of the car upon which the semi-trailer rests during transport.

SUMMARY OF THE INVENTION

Conversely, the present invention applies to all types of rail cars for transporting semi-trailers without any need for a special structure such as the housing described above to transport them. It is not dependent upon a particular supporting structure forming part of an assembly of specific elements for rail transportation of semi-trailers. It can be attached to the end of a rail car onto conventional rail car structural elements, requiring no specific supplemental device.

To accomplish this, there is a removable supporting cross-member, lightweight and compact, with an integrated fifth wheel, adjustable in height, allowing the semi-trailer to be displaced, to be placed horizontally upon the supporting railway structure forming part of the rail car, secured for rail transport and the operations reversed during unloading, all using only a simple tractor, forklift or other handling device appropriately dimensioned for the work to be performed.

One of the principal goals of the invention is the ability to transport any semi-trailer in horizontal position in a rail car using a simple assembly and mechanism to quickly adjust the distance of the fifth wheel relative to body of the cross-member, that is, its height relative to the ground, and to do this prior to loading the semi-trailer onto the rail car. To do this, the removable assembly formed by the fifth wheel and its support must be as thin as possible and capable of being put into operation quickly and easily.

BRIEF DESCRIPTION OF THE DRAWINGS

Other characteristics and features of the invention will be apparent from the following description, provided byway of example and accompanied by the attached drawings, in which:

FIGS. 8 through 15 are successive schematic representations showing implementation of the supporting cross-member according to the invention in which, FIG. 8 shows how a forklift grips the cross-member on the ground, with a semi-trailer stopped nearby and resting on its support posts;

FIG. 9 shows the positioning of the cross-member on the kingpin of the semi-trailer resting on its support posts;

FIGS. 10 and 11 show a first variation of the operation of adjusting the height of the fifth wheel without using the forklift, with the forklift advancing to free the cross-member in FIG. 10 and the operator adjusting the height of the fifth wheel using a mechanism that is part of the cross-member in FIG. 11;

FIG. 12 shows a second variation of the operation of adjusting the height of the fifth wheel, this time using a forklift;

FIG. 13 shows the transportation of the semi-trailer using a forklift, with the semi-trailer in a slightly inclined position so it no longer rests on its supports;

FIG. 14 is a plane view representing the semi-trailer during loading;

FIG. 15 is a plane view with the semi-trailer in place for transport and the supporting cross-member contacting the longitudinal side elements of the supporting railway structure.

DETAILED DESCRIPTION OF THE PREFERRED EMBODIMENTS

Figure 1:
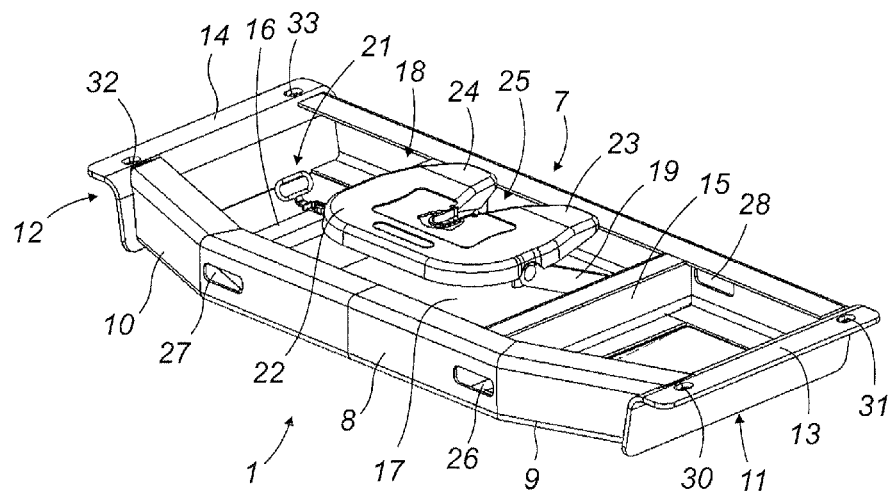
FIG. 1 is a perspective view of the front of the supporting cross-member according to the invention.

Supporting cross-member 1 according to the invention is designed to serve as a temporary support for manipulating a semi-trailer 2 to be transported in a railway transport car 3, specifically an intermodal car, and to block it in all directions during rail transport.

The maneuvers displacing semi-trailer 2 from its parked position where it rests on supports 4 to rail car 3 take place using a conventional type of tractor or forklift 5 with forks 6. This type of tractor or forklift exists currently in shipping ports.

It is also possible to use other types of handling devices such as a gantry crane or other crane type of lifting mechanism or cargo beam, for example.

The removable, manipulable supporting cross-member 1 of the invention is a thin, relatively flat structure similar to the well-known pallet used for supporting merchandise; it can be entirely manipulated using a tractor or forklift 5 with conventional forks or other device suitably dimensioned for the work to be performed.

The body of cross-member 1 is preferably a metal structure that is flanged or in a mechanically soldered frame with a generally rectangular perimeter, for example with the long rear side 7 being rectilinear and the front side having a straight central segment 8 extending on either side into an oblique segment 9 and 10, each rejoining a flat lateral edge portion 11 and 12 preferably with an inverted L-shape section, each forming a right angle wedge with a flat contact edge 13 and 14. The portions forming the long front and rear sides may have a C-shaped section, for example.

Cross-member 1 preferably comprises two rigidifying interior portions 15 and 16 defining a central space 17 occupied by a fifth wheel 18. Wheel 18 is preferably mounted so as to pivot on a transverse horizontal axis and supported by two angled levers or rods 19 or 20, also pivoting, or the like, on interior elements 15 and 16. Fifth wheel 18 can be locked with a conventional bolt actuated with a handle, for example, and displaced upwards and locked by a lifting mechanism, not shown.

Fifth wheel 18 is a known type that is compatible with the kingpin 48 of the semi-trailers to be loaded and generally consists of the usual type of fifth wheel.

The fifth wheel 18 is the equivalent of those that exist on tractor trailer trucks for coupling to semi-trailers to be transported.

Fifth wheel 18 has a contact area 22 with two inclined ramps 23 and 24 defining between them a V-shaped entry zone 25 for the kingpin 48 of the semi-trailer 2.

Fifth wheel 18 is adjustable in height relative to the body of cross-member 1 using a conventional lifting mechanism, not shown. This lifting mechanism allows the height of fifth wheel 18 to be adjusted. The lifting and adjusting mechanism may be actuated by an operator, from the side, for example, as in the operating variation shown in FIGS. 10 and 11. It may also be designed for actuation by modifying the height of fork 6 on forklift 5 as in the variation shown in FIG. 12, or by any equivalent means on the handling device used.

This mechanism is automatically locked to recover all the vertical force coming from the semi-trailer 2. Kingpin 48, engaged with fifth wheel 18, is blocked in all directions. Cross-member 1, the supporting mechanism for fifth wheel 18 and the fifth wheel itself ensure that semi-trailer 2 is maintained during the handling operations and during rail transport, in the course of which cross-member 1 contacts the upper edges of the supporting rail structure and is immobilized against them, as will be seen below.

In the embodiment shown, supporting cross-member 1 also has on its long front side two front openings 26 and 27 that are calibrated and preferably symmetrical relative to the longitudinal median plane for the passage of the arms 6 on the tractor or forklift 5. These front openings are preferably duplicated by two identical rear openings 28 and 29.

The arms of fork 6 can therefore rest on these openings 26 through 29 when moving vertically.

As previously indicated, it is possible to use other handling devices. Naturally, the mechanical interface between the gripping elements of these devices and the cross-member may be modified depending upon the type of handling device used.

For example, if a crane is used, openings 26 through 29 used as passageways for the arms of fork 6 on forklift 5 may be replaced by recovery rings for the cargo slings.

Other interfaces may exist on this cross-member allowing it to be used with various handling devices.

According to a preferred embodiment, lateral edge sections 11 and 12 forming the end cross-members each have two immobilizing openings 30, 31 and 32, 33 through which projections or immobilizing pins 34, 35 and 36, 37 on car 3 will pass.

Figure 2:
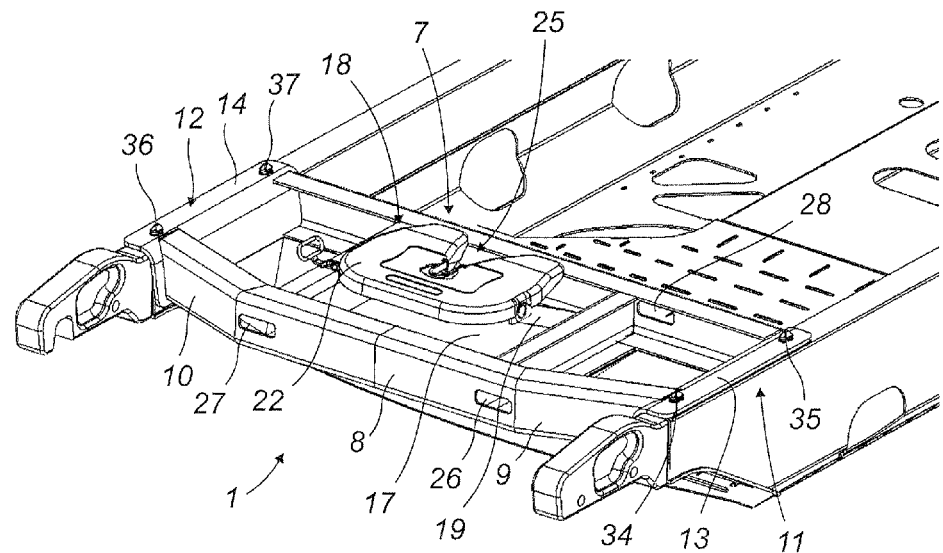
FIG. 2 is a perspective view of the front of the supporting cross-member according to the invention positioned for transportation, that is, positioned on the extremity of a supporting railway structure.
Figure 3:
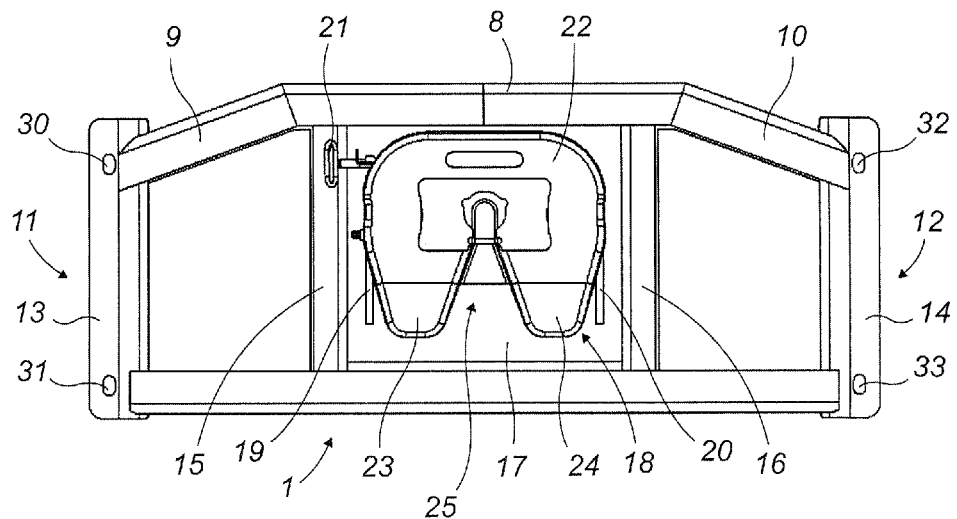
FIG. 3 is a plane overhead view of the supporting cross-member according to the invention
Figure 4:
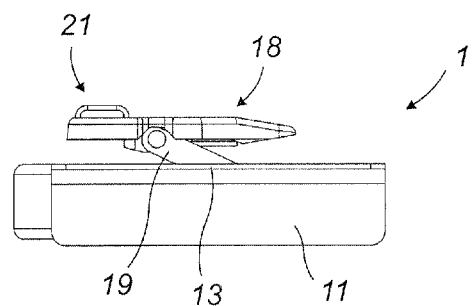
FIG. 4 is a profile view of the supporting cross-member according to the invention showing the fifth wheel.
Figure 5:
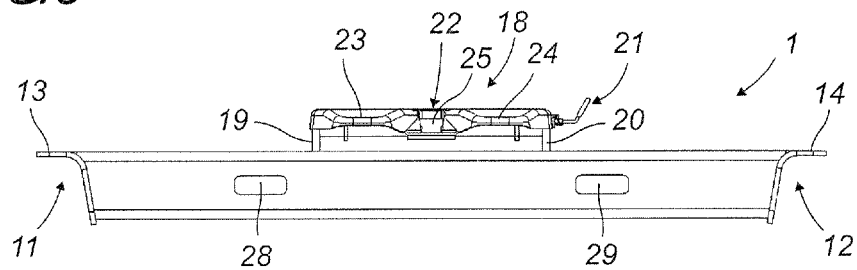
FIG. 5 is a rear view of the supporting cross-member according to the invention showing the openings for the fork on the lifting device.
Figure 6:
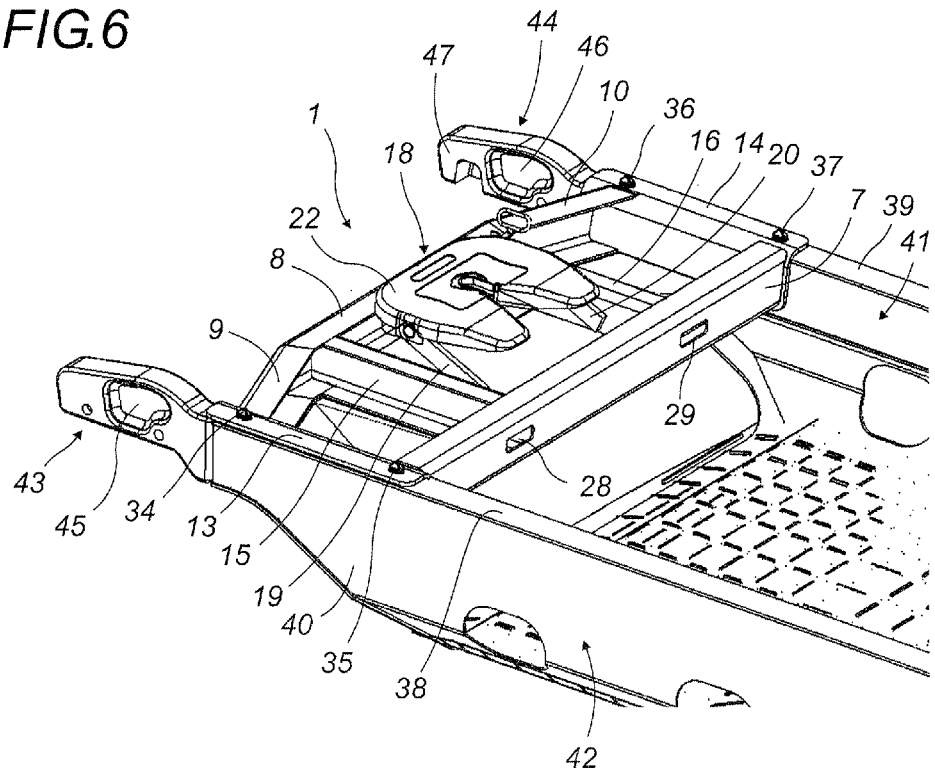
FIG. 6 is a perspective view of the rear of the supporting cross-member in place on the supporting railway structure.
Figure 7:
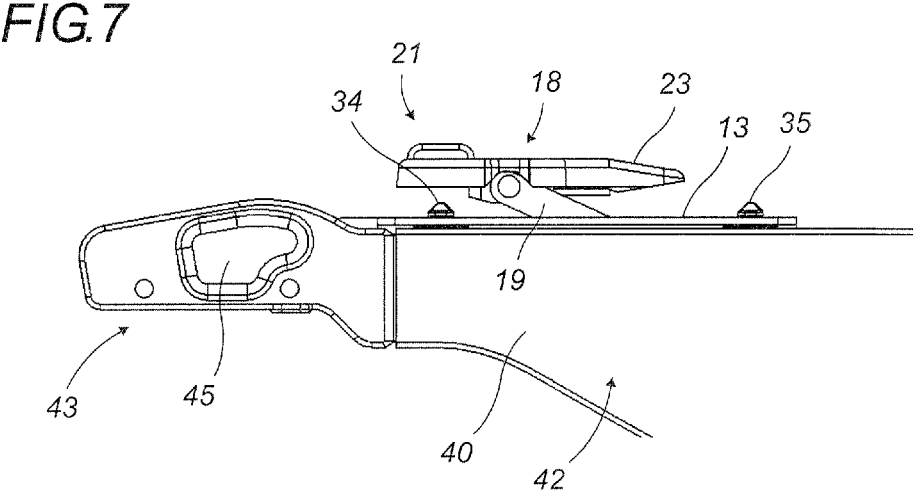
FIG. 7 is a profile view of a portion of FIG. 6.

These projections 34 through 37 visible in FIGS. 2, 6 and 7 are integral with upper edges 38 and 39 of right longitudinal element 40 and left longitudinal element 41 on the side of a supporting railway structure 42 that pivots at one extremity, one non-limiting example of which has been shown in FIGS. 2 through 6. Railway structure 42 has two front extremities 43 and 44 with openings 45 and 46 and hook shaped terminal structures 47.

Projections 34 through 37 are accessible from the top.

They may, of course, consist of mechanical blocks that are removable or connected to upper edges 38, 39 by a hinge or other articulation or temporary attachment means or they may be attached to these edges in some other way.

Said projections 34 through 37 may include a locking function such as, for example, bolts or twisting locks. These projections guarantee that the front of the trailer is immobilized and maintained throughout transport.

Projections 34 through 37 may be simple pieces or elements with integrated locks, for example, the twisting types of locks used for attaching ISO containers.

Obviously other means of immobilizing cross-member 1 on supporting railway structure 42 may be conceived by a person skilled in the art without departing from the scope of the present invention. Projections 34 through 37 on supporting railway structure 42 might be replaced by any type of locking fingers or hooks, and openings 30 through 33 in cross-member 1 by any type of rings or immobilizing cavities.

Likewise, the immobilizing openings and projections may be reversed with cross-member 1 having the projections, pins, fingers, hooks or other immobilizing projections and supporting railway structure 42 having the immobilizing openings or cavities with which the projecting immobilizing structures engage.

It is possible to envision any other suitable means for immobilizing cross-member 1 on supporting railway structure 42, and more generally, on a rail car structure at one of its extremities.

To facilitate placement of cross-member 1, indexes and a stop (not shown) are advantageously provided on each of the upper edges 38, 39 of longitudinal side elements 40, 41 of the supporting railway structure 42 at the appropriate level, as well as auto-centering structures.

Obviously, it is possible to attach cross-member 1 to any other structural element located at the rail car extremity.

Next, the phase of loading a semi-trailer 2 using supporting cross-member 1 of the invention will be described with reference to FIGS. 8 through 15.

Semi-trailer 2 has been separated from its towing vehicle and awaits loading in a parking area. Its front portion rests on support posts 4.

Supporting member 1, having been brought from another loading operation or from storage, is placed on the ground or is already held by the chariot or forklift. This device raises cross-member 1 by engaging its fork arms 6 in front openings 26, 27 and then rear openings 28, 29 of cross-member 1. It lifts it to the appropriate height for attachment to kingpin 48. This operation is simplified by the converging shape of the entry area 25 on fifth wheel 18. Kingpin 48 of semi-trailer 2 is locked into fifth wheel 18 in the same way it is articulated to a towing vehicle.

The operator regulates either manually (FIGS. 10 and 11) or by actuating the lifting mechanism for fork 6 of tractor 5 (FIG. 12) the height of cross-member 1 relative to the ground or the separation between the body of cross-member 1 and fifth wheel 18 so as to obtain the correct distance necessary for semi-trailer 2 to be approximately in horizontal transport position on rail car 3 provided for this purpose. This regulation is accomplished by acting on the connecting mechanism, called the lifting mechanism, above, that is between fifth wheel 18 and cross-member 1, an action which results in variations in the separation between them and thus in the vertical position of cross-member 1 relative to the ground.

Next, the front of semi-trailer 2 is raised to free support posts 4 from contact with the ground (FIG. 13). Semi-trailer 2 is pulled by forklift 5 and its rear portion placed opposite the extremity of supporting structure 42 with car 3 in the open pivoted position in which it moves backwards when pushed by forklift 5 (FIG. 14).

In another type of loading operation, for example, when the railway structure is open at both ends, the forklift may traverse the length of it while pulling the semi-trailer.

Having arrived opposite the indexes and in abutment with the block (not shown) on each upper edge 38, 39 of longitudinal side elements 40, 41 of supporting railway structure 42, supporting cross-member 1 is centered with the help of converging shapes so that its immobilizing openings 30 through 33 arrive opposite immobilizing projections 34 through 37 on supporting railway structure 42. A very slight lowering motion allows cross-member 1 to come to rest upon upper edges 38, 39 of supporting railway structure 42 at the flat portion of each of its lateral edge elements 11, 12. Depending on the situation, it is locked in the area of the openings using twisting or other types of locks.

In this state, semi-trailer 2 is correctly centered in the supporting railway structure 42, resting vertically on its wheels and horizontally or quasi-horizontally on fifth wheel 18. Support posts 4 are released and semi-trailer 2 is locked in all directions according to the regulations in effect.

Next, or before locking takes place, fork 6 is disengaged from cross-member 1 by the forward movement of forklift 5. This device is then available for another loading or unloading operation (FIG. 15).

Rail car 3 is then closed by pivoting supporting railway structure 42 and it is ready for departure. Once the rail car is closed, the semi-trailer conforms to railway clearance dimensions.

Unloading is accomplished by performing all the operations described above in reverse order.

As previously indicated, other modes and handling devices may be used, with the above operations taking place in more or less the same way.

The invention claimed is:

1. A supporting cross-member (1) that can be removed from a rail transport car and manipulated by a handling device for loading, unloading and securing a semi-trailer (2) onto each of a fixed supporting railway structure (42), a removable supporting railway structure (42) or a movable supporting railway structure (42) on the rail transport car (3), the supporting cross-member (1) comprising:
   a body which supports a fifth wheel (18), and the fifth wheel (18) being adapted to receive a kingpin (48) of the semi-trailer (2) and ensure that the kingpin (48) is engaged and retained in engagement during manipulation and rail transport of the semi-trailer;
   the cross-member (1) comprising a mechanical gripping interface (26, 27, 28, 29) so the cross-member (1) can be manipulated by the handling device (5);
   a mechanism for raising a vertical position of the fifth wheel (18) relative to the body of the cross-member (1) when the fifth wheel is engaged with the kingpin of the semi-trailer;
   a means for locking the fifth wheel in position relative to the body of the cross-member (1);
   each opposed side of the cross-member (1) having a lateral side edge;
   at least one retainer (30, 31, 32, 33), for either immobilizing or retaining the cross-member (1) on the supporting railway structure (42), being arranged on at least one lateral side edge of the cross-member (1);
   the body of the cross-member being a generally flat body formed of a metal base structure supporting the fifth wheel (18); and
   the at least one retainer (30, 31, 32, 33), on the at least one lateral side edge of the cross-member (1), directly supporting the cross member along upper lateral edges (38, 39) of the supporting railway structure (42);
   an opening of the at least one retainer (30, 31, 32, 33) on the at least one of the lateral side edges for selectively engaging the cross-member (1) at a desired location along the upper lateral edges (38, 39) of the supporting railway structure (42) and selectively securing the cross-member (1) to the upper lateral edges (38, 39) of the supporting railway structure (42) during rail transport of the semi-trailer (2).

2. The supporting cross-member (1) according to claim 1, wherein the metal base structure is formed of either flanged portions or a mechanically soldered frame with a generally rectangular perimeter which extends, during use, between the upper lateral edges (38, 39) of the supporting railway structure (42).

3. The supporting cross-member (1) according to claim 2, wherein the body of the cross-member (1) comprises a longer rectilinear rear side (7); and a front side with a straight central segment (8) which extends laterally, the straight central segment has opposite lateral ends that are fixed to respective oblique segments (9, 10), and each of the oblique segments has a remote end that is respectively fixed to a flat lateral edge portion (11, 12) of the respective opposed lateral side edges of the cross-member(1).

4. The supporting cross-member (1) according to claim 3, wherein the rear side (7) and the front side (8, 9, 10) have a C-shaped cross-section and the flat lateral edge portions (11, 12) of each of the opposed lateral side edges have an inverted L-shaped cross-section.

5. The supporting cross-member (1) according to claim 1, wherein the cross-member further comprises two interior rigidifying rigid portions (15, 16) that define a central space (17) of the fifth wheel (18).

6. The supporting cross-member (1) according to claim 3, wherein the fifth wheel (18) pivots on a horizontal transverse axle and is attached to two inclined levers or rods (19, 20), forming part of the mechanism for raising the position of the fifth wheel, and each of the two inclined levers or rods (19, 20) are pivotally connected to complementary interior elements (15, 16) of the body of cross-member (1), and the complementary interior elements are fixed to the rear side and to the front side of the cross-member.

7. The supporting cross-member (1) according to claim 1, wherein a contact surface (22) of the fifth wheel (18) has two inclined ramps (23, 24) which define a V-shaped entry zone (25) between the two inclined ramps (23, 24) for the kingpin (48) of the semi-trailer (2).

8. The supporting cross-member (1) according to claim 1, wherein the mechanical gripping interface is one of a series of openings (26, 27, 28, 29) compatible with a fork (6) of a forklift (5), or an assembly of either rings or other recovery elements compatible with either cargo slings of a crane or gripping devices on a cargo beam.

9. The supporting cross-member (1) according to claim 1, wherein the mechanism for raising the position of the fifth wheel (18), with respect to the cross-member (1), is actuated either by an operator or by using the handling device such that when the kingpin of the semi-trailer is engaged with the fifth wheel, a height of the fifth wheel relative to the cross-member is adjusted; and
 a height of the cross-member (1) relative to a ground is regulated by the operator either manually or by actuation of a lifting mechanism of the handling device.

10. The supporting cross-member (1) according to claim 1, wherein the mechanism for raising the position of the fifth wheel (18) has a lock which is locked either automatically or by using a handle (21) to recover vertical force originating from the semi-trailer (2) when the kingpin (48) is engaged with the fifth wheel (18).

11. The supporting cross-member (1) according to claim 1, wherein the at least one retainer further includes a stop block on each upper lateral edges (38, 39) of longitudinal side elements (40, 41) of the supporting railway structure (42), and opposite immobilizing projections (34, 35, 36, 37) on the supporting railway structure (42).

12. The supporting cross-member (1) according to claim 1, further comprising a means for centering the body of the cross-member (1) on the rail transport car, such that one of the lateral side edges of opposed sides of the cross-member (1) contacts a respective one of the upper lateral edges (38, 39) of the supporting railway structure (42); and
 the other of the lateral side edges of opposed sides of the cross-member (1) contacts a respective other one of the upper lateral edges (38, 39) of the supporting railway structure (42) during rail transport of the semi-trailer (2).

13. The supporting cross-member (1) according to claim 1, wherein each of the lateral side edges of the supporting cross-member (1) at least partially, respectively, engages with each of the upper lateral edges (38, 39) and inwardly facing lateral sides of the supporting railway structure (42) during rail transport of the semi-trailer (2).

14. The supporting cross-member (1) according to claim 13, wherein each lateral side edge has a portion (12, 11) with an inverse L-shaped section constituting a right angle wedge with a flat contact edge (13, 14), the flat contact edges extend laterally outward and are respectively supported on the upper lateral edges of the supporting railway structure.

15. The supporting cross-member (1) according to claim 1, wherein the at least one retainer for immobilizing or retaining the cross-member (1) on upper lateral edges (38, 39) of the supporting railway structure (42) further comprises an assembly of at least one of either immobilizing or retention openings (30, 31, 32, 33), rings, immobilizing cavities, projections, pins, fingers, hooks and projecting immobilization structures which cooperate with complementary structures on the supporting railway structure (42).

16. The supporting cross-member (1) according to claim 1, wherein the at least one retainer further comprises a plurality of fasteners for locking the cross-member (1) onto the supporting railway structure (42).

17. The supporting cross-member (1) according to claim 16, wherein the plurality of fasteners comprises twisting or bolt locks.

18. A method for loading a semi-trailer onto a rail car using a supporting cross-member (1) that can be removed and manipulated by a handling device for loading, unloading and securing a semi-trailer (2) onto a fixed, removable or movable supporting railway structure (42) on a rail transport car (3), the supporting cross-member (1) comprising:
 a body and a support for receiving a fifth wheel (18) adapted to receive a kingpin (48) of the semi-trailer (2) and to ensure that the fifth wheel (18) is maintained during manipulation and rail transport;
 a mechanical gripping interface (26, 27, 28, 29) so the cross-member (1) can be manipulated by a handling device (5);
 a lifting mechanism for raising a position of the fifth wheel (18) relative to the body of the cross-member (1);
 a means for locking the fifth wheel in position relative to the body of the cross-member (1);
 at least one means (30, 31, 32, 33) for either immobilizing or retaining the cross-member (1) on the supporting railway structure (42);
 the body of the cross-member is a generally flat body formed of a metal base structure supporting the fifth wheel (18); and
 a contact means on the upper edges (38, 39) of the supporting railway structure (42), the method comprising the steps of:
 initiating the method when the semi-trailer (2) is separated from a towing vehicle and resting in a parking area to be loaded with a front portion resting on support posts (4), and when the supporting cross-member (1) having been brought either from another loading operation or from a storage area, is either positioned on a ground to be gripped by a fork of the handling device (5) or is already gripped by the fork (6) of the handling device (5), the fork (6) raises the cross-member (1) by engaging arms of the fork (6) in front openings (26, 27) and then rear openings (28, 29) of the cross-member (1);

carrying the cross-member (1) at a height adapted for attachment to the kingpin (48);

regulating, either manually or by actuating the forked lifting element (6) of the handling device (5), the height of the cross-member (1) relative to the ground or a distance between the cross-member (1) and the fifth wheel (18) so as to obtain a necessary distance for the semi-trailer (2) to be located approximately horizontally in a transport position in the rail transport car (3) provided for this purpose, by acting on the lifting mechanism for the fifth wheel (18) that exists between the fifth wheel (18) and the cross-member (1);

raising the front portion of the semi-trailer (2) to free the support posts (4) from contact with the ground;

pulling the semi-trailer (2) by the handling device (5) by the front portion, and positioning the semi-trailer (2) until a and its rear portion of the semi-trailer (2) is placed opposite the extremity of the supporting structure (42) of the rail transport car (3) while the rail transport car (3) is in an open position, then the semi-trailer (2) in which it moves backwards when pushed by the handling device (5);

centering the supporting cross-member (1), once the supporting cross-member (1) reaches the indexes and contacts a stop block on each upper edge (38, 39) of longitudinal side elements (40, 41) of the supporting structure (42), so that immobilizing openings (30-33) of the supporting cross-member (1) are opposite immobilizing projections (34-37) on the supporting structure (42);

moving the cross-member (1) downward to rest the cross-member (1) against the upper edges (38, 39) of the supporting structure (42) on a flat area of each of lateral edge portions (11, 12) of upper edges (38, 39);

locking the immobilizing openings (30-33) of the cross-member (1) using either twisting locks or other type of locks;

releasing the support posts (4) and further locking the semi-trailer (2), with regards to the rail transport car (3), in accordance with all regulations in effect; and disconnecting the fork (6) from the cross-member (1) when the handling device (5) moves forward and thereby enabling both the cross-member (1) and the handling device (5) to become available for another operation.

19. A supporting cross-member that can be removably fixed directly to a rail transport car and can be maneuvered by a handling device for loading, unloading and securing a semi-trailer onto a supporting railway structure on the rail transport car, the cross-member comprising;

a flat body having a metal frame to which a fifth wheel is movably coupled;

the fifth wheel receives a kingpin of the semi-trailer and maintains engagement of the kingpin of the semi-trailer during maneuvering and rail transport of the semi-trailer;

a mechanism is connected to the fifth wheel which vertically raises the fifth wheel relative to the body of the cross-member when the kingpin of the semi-trailer is engaged with the fifth wheel to adjust a vertical position of the fifth wheel relative to the body of the cross member;

a releasable locking means for locking a height of the fifth wheel in position relative to the body of the cross-member;

the body comprising a mechanical gripping interface which receives gripping elements of the handling device such that the cross-member can be supported and manipulated by the handling device;

the body of the cross-member having opposed lateral side edges;

contact means of the body, along the opposed lateral side edges, directly mating with corresponding upper side lateral edges of the supporting railway structure such that the cross-member is directly connected to and supported by the upper side lateral edges of the supporting railway structure; and at least one connecting means, being arranged on at least one of the lateral side edges of the cross-member, removably fixes the contact means of the body at a desired location along the upper side lateral edges of the supporting railway structure so as to either selectively immobilize or retain the cross-member at the desired location along the upper side lateral edges on the supporting railway structure of the rail transport car.

* * * * *